(12) United States Patent
Geisler

(10) Patent No.: US 6,436,622 B1
(45) Date of Patent: Aug. 20, 2002

(54) THERMOGRAPHIC MATERIAL WITH ADHESION-PROMOTING LAYER AND METHOD OF MAKING

(75) Inventor: Thomas C. Geisler, Cottage Grove, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/002,216

(22) Filed: Nov. 1, 2001

Related U.S. Application Data

(63) Continuation-in-part of application No. 09/510,648, filed on Feb. 23, 2000, now Pat. No. 6,355,405.
(60) Provisional application No. 60/121,794, filed on Feb. 26, 1999.

(51) Int. Cl.[7] .......................... G03C 1/835; G03C 1/89; G03C 1/93; G03C 1/498
(52) U.S. Cl. .................. 430/527; 430/531; 430/533; 430/534; 430/536; 430/617; 430/964
(58) Field of Search .................. 430/531, 534, 430/533, 536, 617, 964, 527, 200

(56) References Cited

U.S. PATENT DOCUMENTS

| | | |
|---|---|---|
| 3,492,122 A | 1/1970 | Takenaka et al. |
| 4,001,024 A | 1/1977 | Dittman et al. |
| 4,093,458 A | 6/1978 | McGrail et al. ............. 430/534 |
| 4,366,239 A | 12/1982 | Shinagawa et al. ......... 430/533 |
| 4,477,562 A | 10/1984 | Zeller-Pendrey ............ 430/617 |
| 4,569,863 A | 2/1986 | Koepke et al. |
| 4,572,849 A | 2/1986 | Koepke et al. |
| 4,752,559 A | 6/1988 | Helland et al. ............. 430/536 |
| 5,004,669 A | 4/1991 | Yamada et al. ............. 430/531 |
| 5,223,384 A | 6/1993 | Ohbayashi et al. ......... 430/619 |
| 5,244,780 A | 9/1993 | Strobel et al. |
| 5,384,192 A | 1/1995 | Long et al. |
| 5,466,541 A | 11/1995 | Havenbergh et al. |
| 5,525,376 A | 6/1996 | Leonard |
| 5,639,589 A | 6/1997 | Bauer et al. |
| 5,641,544 A | 6/1997 | Melancon et al. |
| 5,733,608 A | 3/1998 | Kessel et al. |
| 5,789,145 A | 8/1998 | Glocker et al. ............. 430/531 |
| 5,843,530 A | 12/1998 | Jerry et al. |
| 5,849,363 A | 12/1998 | Yapel et al. |
| 5,861,195 A | 1/1999 | Bhave et al. |
| 5,928,857 A | 7/1999 | Geisler et al. ............. 430/531 |
| 6,007,874 A | 12/1999 | Bhave et al. |

FOREIGN PATENT DOCUMENTS

| | | |
|---|---|---|
| EP | 0 810 467 A1 | 12/1997 |
| WO | 96/15478 | 10/1995 |

Primary Examiner—Richard L. Schilling
(74) Attorney, Agent, or Firm—J. Lanny Tucker

(57) ABSTRACT

Multilayer thermographic materials have improved adhesion between a polymeric support and film-forming polymer-containing layers disposed thereon. This improved adhesion is provided by including in the adhesion-promoting layer next to the support two or more polymers having specific properties. At least one of the polymers adheres the layer to the support, and at least one other polymer is compatible or of the same class as the film-forming polymer in the upper layer, such as a thermographic imaging layer. This adhesion-promoting layer can be provided as a very thin "carrier" layer during coating operations so that desired imaging effects and functional properties are obtained.

27 Claims, No Drawings

THERMOGRAPHIC MATERIAL WITH ADHESION-PROMOTING LAYER AND METHOD OF MAKING

RELATED APPLICATIONS

This application is a Continuation-in-part of recently allowed U.S. Ser. No. 09//510,648 that was filed Feb. 23, 2000 and based on Provisional No. 60/121,794 that was filed Feb. 26, 1999.

FIELD OF THE INVENTION

This invention relates to thermographic materials having two or more layers on a polymeric support. A layer next to the support has a single-phase mixture of polymers that provides multiple properties including adhesion of the layer to the polymeric support. The invention also relates to a method of preparing the noted thermographic materials.

BACKGROUND OF THE INVENTION

Thermographic imaging materials (that is, non-photosensitive, heat-developable materials) processed with heat, and without liquid development, are widely known in the imaging arts and rely on the use of heat to help produce an image. These materials generally comprise a support or substrate (such as paper, plastics, metals, glass, and the like) having coated thereon: a thermally-sensitive, reducible silver source, a reducing agent for the thermally-sensitive, educible silver source (that is, a "developer" that can reduce silver ion to metallic silver), and a binder.

In a typical thermographic construction, the image-forming layers re based on silver salts of long chain fatty acids. Typically, the preferred n-photosensitive reducible silver source is a silver salt of a long chain aliphatic carboxylic acid having from 10 to 30 carbon atoms (such as, silver behenate or silver salts of other fatty acids of similar molecular weight).

Upon exposure of the thermographic material to thermal energy, silver salt is reduced by the incorporated reducing agent whereby a black-and-white image of elemental silver is formed. Typical reducing agents for silver ion are methyl gallate, hydroquinone, substituted-hydroquinones, hindered phenols, catechol, pyrogallol, ascorbic acid, ascorbic acid derivatives, and the like, Some thermographic constructions are imaged by contacting them with the thermal head of a thermographic recording apparatus, such as in a thermal printer, thermal facsimile, and the like. Other thermographic constructions are imaged by using the heat of a scanning laser. Still others are imaged by contact with a thermal blanket or roller.

The preparation of thermographic imaging materials requires solving several problems. One major problem is that of coating the thermographic material. Because the necessary image-forming chemistry is within the material itself, the binders used in thermographic elements must be stable for thermal imaging processing and provide both layer cohesion and interlayer adhesion. In addition, all coatings usually require a specific range of adhesion with underlying coatings or supports (such as polyester substrates) to meet useful end purposes. The conventional state of the art is to treat the support surface in some manner, such as with electrical corona treatment, flame treatment and glow discharge, to increase wettability and bonding strength. While these treatments do provide increased adhesion, they also leave charge or surface irregularities on the support that result in surface irregularities when an organic solvent based coating is applied. Other disadvantages with such treatments are high inherent capital costs, maintenance and upkeep of the equipment and in some cases the need for inert gases.

Another manner for improving adhesion is to apply a primer layer on the support prior to applying other layers including imaging layers. Such coatings include a wide range of formulations, and are usually aqueous in nature to provide the desired adhesion to subsequent layers. These methods are generally inadequate when organic solvent-based coatings are applied to the primer layer due to poor adhesion and/or migration of the components from the primer layer into upper layers. This results in a variety of unwanted physical and chemical problems (for example, coating discoloration, haze, static discharge, poor coating quality and poor sensitometry).

WO 96/15478 (Geisler et al.) and U.S. Pat. No. 5,928,857 (Geisler et al.) describe spectrally sensitized photothermographic elements having improved adhesion using additional adhesive materials in the photosensitive layer. Thus, besides the usual polyvinyl butyral binder, the photosensitive layer also includes a polymeric component that is not a polyvinyl acetal. This polymeric component has a higher strength of adhesion to polyester film than a polyvinyl acetal and the improved adhesion is readily observed in high-density image areas.

Primer layers for photothermographic materials are described for example in U.S. Pat. No. 4,752,559 (Helland et al.) to include a pigmented acrylic polymer binder system. This binder system is said to adhere to a photosensitive layer containing a variety of polymer binders including polyvinyl acetals. Polymeric substrates can also be coated with a polyacrylate/gelatin composition that either adheres the photosensitive layer to the substrate or includes the photosensitive materials, as described in U.S. Pat. No. 5,244,780 (Strobel et al.).

Block and graft copolymers are described as adhesion-promoting materials in U.S. Pat. No. 5,384,192 (Long et al.) between the support and the organic polymer layer (photosensitive layer). The copolymers have a component compatible with the organic polymer layer and a polyvinyl phenol. Other more complicated polymer subbing layer materials are described in U.S. Pat. No. 5,639,589 (Bauer et al.).

The use of primer layers may be necessary in some instances, but as noted above, their use presents a number of problems. In addition, they require additional coating passes, capital investment and film waste. Curl may also result from application of the additional layer.

There are several known techniques for simultaneous coating of multiple layers. For example, U.S. Pat. No. 4,001,024 (Dittman et al.) describes what is known in the industry as "slide" coating technology in which a plurality of thin layers are applied to a moving web (support) to prepare photographic elements. This technology is best used with the lowermost layer being thinner (wet thickness) than the upper layers. This thinner layer has become known as a "carrier" layer and can be chosen from a wide range of materials that are compatible with the silver/gelatin containing photosensitive layers coated on top so that interlayer mixing can occur without adverse effect.

Thin "accelerating" or carrier layers are described in U.S. Pat. No. 4,569,863 (Koepke et al.) for use in what is known as "curtain" coating methods for preparing multilayer photographic elements. Still other coating techniques are described in U.S. Pat. No. 4,572,849 (Koepke et al.) in which thin accelerating layers are composed of various hydrophilic coating materials. In U.S. Pat. No. 5,641,544 (Melancon et al.), U.S. Pat. No. 5,733,608 (Kessel et al.), U.S. Pat. No. 5,849,363 (Yapel et al.), and U.S. Pat. No. 5,861,195 (Bhave et al.) thin "carrier fluids" and coating fluids are described as comprising non-miscible materials. The carrier layers applied in these procedures are used for some aspect of coating quality such as streak reduction, reducing air entrapment, increased line speed and reduction in "strike through".

While WO 96/15478 and U.S. Pat. No. 5,928,857 (both noted above) describe an advance in the art to adhere photothermographic imaging layer to polyester supports, there is a desire to avoid adding additional components, particularly additional binders, to the imaging layers. Yet, polyvinyl butyral, the most common binder does not satisfactorily bind the imaging layer to the polyester support.

While some polymers effectively adhere imaging layers to a polymeric film support, it has been observed that use of some adhering polymers causes physical or coating defects.

There remains a need then, for increased adhesion between polymeric supports and organic solvent based polymeric layers coated thereon, particularly in imaging materials such as thermographic materials where other properties of the imaging materials are not adversely affected.

SUMMARY OF THE INVENTION

The problems noted above with known coating technologies for providing improved adhesion are solved with the present invention. In particular, this invention provides a thermographic material comprising a polymeric support and having disposed thereon:

a) a thermographic imaging layer containing at least one film-forming polymer, and b) a non-imaging layer interposed between and adhering the thermographic imaging layer and the polymeric support and containing no silver, the non-imaging layer being coated out of a predominantly organic solvent medium, and comprising a single phase mixture of two or more polymers that include a first polymer serving to promote adhesion of the non-imaging layer to the polymeric support, and a second polymer, wherein the film-forming polymer of the thermographic imaging layer and the second polymer of the non-imaging layer are the same or different polyvinyl acetal resins, cellulosic polymers, vinyl polymers, acrylate or methacrylate polymers, or maleic anhydride-ester copolymers.

Thus, the thermographic material described above can be prepared using a method of promoting adhesion of a thermographic imaging layer to a polymeric support comprising:

A) forming on a polymeric support, a non-imaging layer out of a second fluid predominantly comprising a second organic solvent, the non-imaging layer containing no silver, and B) simultaneously or subsequently, forming a thermographic imaging layer containing at least one film-forming polymer out of a first fluid predominantly comprising a first organic solvent on the non-imaging layer, the non-imaging layer comprising a single phase mixture of two or more polymers that include a first polymer serving to promote adhesion between the polymeric support and the non-imaging layer, and a second polymer, wherein the film-forming polymer of the thermographic imaging layer and the second polymer of the non-imaging layer are the same or different polyvinyl acetal resins, cellulosic polymers, vinyl polymers, acrylate or methacrylate polymers, or maleic anhydride-ester copolymers.

The present invention provides advantages with the use of a thin wet "carrier" layer during the coating of thermographic imaging materials. The dried thin carrier layer (identified herein as an "adhesion-promoting layer" on either side of the support) can provide the desired adhesion between polymeric supports, particularly polyester supports, and upper thermographic imaging layers that are formulated and coated out of organic solvents. The use of primer layers and various adhesion-promoting treatments of the support are avoided. The adhesion-promoting layer is as thin as possible so the effects on imaging or functional properties are minimized.

These advantages are achieved because the adhesion-promoting layer is also coated out of an organic solvent and includes a single-phase mixture of one or more "adhesion-promoting polymers" ("first" polymer) and one or more "second" polymers that are compatible with or of the same class as the film-forming polymers in the polymer-containing thermographic imaging layer immediately above. In particular, the second polymers and the film-forming polymers are chosen from one or more classes of polymers that include polyvinyl acetal resins, cellulosic polymers, vinyl polymers, acrylate or methacrylate polymers, or maleic anhydride-ester copolymers.

The adhesion provided by the adhesion-promoting layer is generally greater than the forces applied during any chopping or slitting of the coated thermographic material.

The mixture of two or more polymers are homogeneous (single-phase) in nature both during the coating operations and upon drying as a layer in the thermographic material.

By "compatible with" is meant that the "second" polymer in the adhesion-promoting layer ("second" layer) and at least one film-forming polymer in the upper thermographic imaging layer form a single phase when mixed and during the time it takes for the two layers to dry after coating. The "carrier layer" dries into a distinct layer with little intermixing with the film-forming thermographic imaging layer coated above it except at the interface.

By "of the same class" is meant that the "second" and film-forming polymers are of the same chemical or structural class.

"Thermographic material(s)" means a construction comprising at least one thermographic emulsion layer and any supports, topcoat layers, image receiving layers, blocking layers, protective layers, lubricating layers, subbing layers, or priming layers.

In thermographic materials of the present invention, the layer(s) that contain the non-photosensitive source of reducible silver ions are referred to herein as "thermographic layer(s)," "thermographic emulsion layer(s)", "thermographic imaging layer(s)" or "thermographic image-forming layer(s)". When used in thermographic materials according to the present invention, one or more components of a reducing composition are added either to the thermographic emulsion layer(s) or to a layer(s) adjacent to the emulsion layer(s). Layers that are adjacent to the emulsion layer(s) may be, for example, protective topcoat layers, antistatic layers, interlayers, opacifying layers, barrier layers, or auxiliary layers. It is preferred that the reducing agent system be present in the thermographic layer or topcoat layer.

DETAILED DESCRIPTION OF THE INVENTION

The invention can be used to manufacture thermally-sensitive imaging materials such as thermographic materials. As noted above, thermographic materials are imaged and developed using thermal energy.

The thermographic materials of this invention comprise a flexible support that has any desired thickness and is composed of one or more materials. The support may be transparent, translucent, or opaque. Useful materials for making such supports include, but are not limited to, paper, and polymers (such as polyethylene terephthalate and polyethylene naphthalate), cellulose acetate and other cellulose esters, polyvinyl acetal, polyolefins (such as polyethylene and polypropylene), polycarbonate, and polystyrenes. Preferred supports are composed of polymers having good heat stability, such as polyesters and polycarbonate. Polyethylene terephthalate film is the most preferred transparent support.

Because of the advantages of the present invention, such supports are preferably uncoated and untreated prior to coating the adhesion-promoting and other layers thereon.

The adhesion-promoting, non-imaging layer in the thermographic materials of this invention is coated out of one or more miscible organic solvents including, but not limited to, methyl ethyl ketone (2-butanone, MEK), acetone, toluene, tetrahydrofuran, ethyl acetate, ethanol, methanol, or any mixture of any two or more of these solvents.

The adhesion-promoting layer also includes one or more adhesion-promoting polymers that are generally soluble or dispersible in the organic solvents noted above. Representative adhesion-promoting polymers can be chosen from one or more of the following classes: polyvinyl acetals (such as polyvinyl butyral and polyvinyl formal), cellulosic polymers (such as cellulose acetate, hydroxymethyl cellulose and cellulose acetate butyrate), polyesters, polycarbonates, epoxies, rosin polymers, polyketone resin, vinyl polymers (such as polyvinyl chloride, polyvinyl acetate, polystyrene, polyacrylonitrile, and butadiene-styrene copolymers), acrylate and methacrylate polymers, and maleic anhydride ester copolymers. The polyvinyl acetals, polyesters, cellulosic polymers, and vinyl polymers such as polyvinyl acetate and polyvinyl chloride are particularly preferred, and the polyvinyl acetals, polyesters, and cellulosic polymers are more preferred. Polyester resins are most preferred. Thus, the adhesion-promoting polymers are generally hydrophobic in nature.

The adhesion-promoting polymers are also identified as "first" polymers in the single-phase mixture of polymers. As used herein for all polymeric materials, the term "polymer" is defined to include homopolymers, copolymers and terpolymers.

The adhesion-promoting layer also includes one or more "second" polymers that are compatible with or of the same class as at least one film-forming polymer in the thermographic imaging layer defined herein. Many of the film-forming polymers useful in the thermographic imaging layer are described below (for example, binders used in thermographic imaging layers and other layers that can be disposed above the adhesion-promoting layer). One skilled in the art would readily understand from the teaching herein which polymers are "compatible with" or "of the same class" as those film-forming polymers. Particularly useful "second" polymers include polyvinyl acetals, cellulosic polymers, vinyl polymers (as defined above for the "first" polymer), acrylate and methacrylate polymers, and maleic anhydride-ester copolymers. The most preferred "second" polymers are polyvinyl acetals and cellulosic polymers. Of course, mixtures of these second polymers can be used in the adhesion-promoting layer. These second polymers are also soluble or dispersible in the organic solvents described above.

In some preferred embodiments, both the thermographic imaging and non-imaging layers independently contain at least one polyvinyl acetal or cellulosic polymer.

It is preferred to use a mixture of polymers one of which promotes adhesion to the support and one of which promotes adhesion to the thermographic emulsion layer. For example, when the support is a polyester, and the thermographic emulsion layer contains a polyvinyl butyral, then a preferred mixture of polymers in the adhesion-promoting layer is a single phase mixture of a polyester resin and a polyvinyl acetal such as polyvinyl butyral.

The weight ratio of "first" polymer to "second" polymer (or weight ratio of "third" polymer to the "fourth" polymer as described below) in the adhesion-promoting layer is generally at least 2:98, and preferably at least 4:96. The upper limit of this ratio if generally 95:5 and preferably 90:10.

The adhesion-promoting layer can also include still other polymers that are not defined herein as first or second polymers. These additional polymers can be either hydrophobic or hydrophilic. Some hydrophilic polymers that may be present include, but are not limited to, proteins or polypeptides such as gelatin and gelatin derivatives, polysaccharides, gum arabic, dextrans, polyacrylamides (including polymethacrylamides), polyvinyl pyrrolidones and others that would be readily apparent to one skilled in the art.

Other components of the adhesion-promoting layer include materials that may improve coatability or adhesion, crosslinking agents (such as diisocyanates), surfactants and shelf-aging promotors.

The polymers in the adhesion-promoting layer generally comprise at least 0.1 weight % (preferably at least 0.2 weight %) of the total wet coating weight of the layer. The maximum amount of such polymers is generally 40 weight %, and preferably up to 20 weight %, based on total wet coating weight.

The adhesion-promoting layer is purposely relatively thin when dried in order to provide the desired benefits (that is, sensitometric and physical properties). Typically, its dry thickness is up to 20 $\mu$m, preferably up to 5 $\mu$m and more preferably less than 1 $\mu$m. The minimum dry thickness is generally at least 0.05 $\mu$m and preferably at least 0.15 $\mu$m.

The adhesion-promoting layer is a non-imaging layer used to adhere the thermographic imaging layer to the front side of the polymeric support. In addition, an adhesion-promoting layer can be used as a "fourth" layer (also a non-imaging layer) on the backside of the support beneath an upper "third" layer. The backside "third" layer can be any functional layer such as a second thermographic imaging layer, an interlayer, an antistatic layer, or a layer containing a matting agent. Alternatively, these layers can have multiple functions, such as a layer that is both an antistatic layer and contains matting agent, or any other combination readily apparent to one skilled in the art. The film-forming polymers generally used in such "third" layers are well known in the art and include such classes of polymers as cellulosic polymers, polyvinyl acetals, vinyl polymers, and various acrylic polymers.

The one or more film-forming polymers are generally present in the thermographic imaging layers in an amount of at least 10%, preferably at least 40%, and more preferably at least 50%, based on dry layer weight.

In one embodiment of this invention a thermographic material comprises a polymeric support and has disposed on one side of the polymeric support:

a) a thermographic imaging layer comprising at least one film-forming polymer, and b) a non-imaging layer interposed between and adhering the thermographic imaging layer and the polymeric support and containing no silver, the non-imaging layer being coated out of a predominantly organic solvent medium and comprising two or more polymers that form a single phase mixture, the two or more polymers including a first polymer serving to promote adhesion of the non-imaging layer to the polymeric support, and a second polymer, wherein the film-forming polymer in the thermographic imaging layer and the second polymer in the non-imaging layer are the same or different polyvinyl acetal resins, cellulosic resins, vinyl polymers, acrylate or methacrylate polymers, or maleic anhydride-ester copolymers, and disposed on the opposing side of the polymeric support:

a) a third layer comprising at least one film-forming polymer, and b) a fourth layer interposed between and adhering the third layer and the polymeric support and containing no silver, the fourth layer being coated out of a predominantly organic solvent medium and comprising two or more polymers that form a single phase mixture, the two or more polymers in the fourth layer including a third polymer serving to promote adhesion of the fourth layer to the polymeric support, and a fourth polymer, wherein the film-forming polymer in the third layer and the second polymer in the fourth layer are the same or different polyvinyl acetal resins, cellulosic resins, vinyl polymers, acrylate or methacrylate polymers, or maleic anhydride-ester copolymers.

Preferably, the thermographic layer and non-imaging layer underneath it comprise a polyvinyl acetal resin or a cellulosic polymer, and the third and fourth layers independently comprise a polyvinyl acetal resin or a cellulosic polymer. In addition, the non-imaging layer can include a single phase mixture of a polyvinyl acetal (such as polyvinyl butyral) and a polyester resin.

In one embodiment, the thermographic material includes a silver-containing thermographic imaging layer on the front, and an antistatic layer, or a layer containing a matting agent. The two adhesion-promoting layers are directly disposed on the polymeric support.

As pointed out in more detail below, a thermographic imaging layer comprises at least one or more silver salts of fatty acids, one or more silver reducing agents, and at least one film-forming binder polymers such as a polyvinyl acetal.

A preferred non-imaging adhesion-promoting layer (for either side of the support) that is coated out of a predominantly organic solvent medium comprises a single phase mixture of a polyvinyl acetal and a polyester resin.

Non-Photosensitive Reducible Silver Source Material

The non-photosensitive source of reducible silver ions used in thermographic materials of this invention can be any compound that contains reducible silver (1+) ions. Preferably, it is a silver salt that is comparatively stable to light and forms a silver image when heated to 50° C. or higher in the presence of a reducing composition.

Silver salts of organic acids, particularly silver salts of long-chain carboxylic acids are preferred. The chains typically contain 10 to 30, and preferably 15 to 28, carbon atoms. Suitable organic silver salts include silver salts of organic compounds having a carboxylic acid group. Examples thereof include a silver salt of an aliphatic carboxylic acid or a silver salt of an aromatic carboxylic acid. Preferred examples of the silver salts of aliphatic carboxylic acids include silver behenate, silver arachidate, silver stearate, silver oleate, silver laurate, silver caprate, silver myristate, silver palmitate, silver maleate, silver fumarate, silver tartarate, silver furoate, silver linoleate, silver butyrate, silver camphorate, and mixtures thereof. Preferably, at least silver behenate is used alone or in mixtures with other silver salts.

Preferred examples of the silver salts of aromatic carboxylic acid and other carboxylic acid group-containing compounds include, but are not limited to, silver benzoates, or a silver substituted-benzoate (such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, silver tannate, silver phthalate, silver terephthalate, silver salicylate, silver phenylacetate, and silver pyromellitate).

Silver salts of aliphatic carboxylic acids containing a thioether group as described in U.S. Pat. No. 3,330,663 (Weyde et al.) are useful. Soluble silver carboxylates comprising hydrocarbon chains incorporating ether or thioether linkages, or sterically hindered substitution in the α- (on a hydrocarbon group) or ortho- (on an aromatic group) position, and displaying increased solubility in coating solvents and affording coatings with less light scattering can also be used. Such silver carboxylates are described in U.S. Pat. No. 5,491,059 (Whitcomb). Mixtures of any of the silver salts described herein can also be used if desired.

Silver salts of sulfonates are also useful in the practice of this invention. Such materials are described for example in U.S. Pat. No. 4,504,575 (Lee). Silver salts of sulfosuccinates are also useful as described for example in EP-A-0 227 141 (Leenders et al.).

Silver salts of compounds containing mercapto or thione groups and derivatives thereof can also be used. Preferred examples of these compounds include, but are not limited to, a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethylglycolamido)benzothiazole, silver salts of thioglycolic acids (such as a silver salt of a S-alkylthioglycolic acid, wherein the alkyl group has from 12 to 22 carbon atoms), silver salts of dithiocarboxylic acids (such as a silver salt of dithioacetic acid), a silver salt of thioamide, a silver salt of 5-carboxylic-1-methyl-2-phenyl-4-thiopyridine, a silver salt of mercaptotriazine, a silver salt of 2-mercaptobenzoxazole, silver salts as described in U.S. Pat. No. 4,123,274 (Knight et al.) (for example, a silver salt of a 1,2,4-mercaptothiazole derivative, such as a silver salt of 3-amino-5-benzylthio-1, 2,4-thiazole), and a silver salt of thione compounds [such as a silver salt of 3-(2-carboxyethyl)-4-methyl-4-thiazoline-2-thione as described in U.S. Pat. No. 3,785,830 (Sullivan et al.).].

Furthermore, a silver salt of a compound containing an imino group can be used. Preferred examples of these compounds include, but are not limited to, silver salts of benzotriazole and substituted derivatives thereof (for example, silver methylbenzotriazole and silver 5-chlorobenzotriazole), silver salts of 1,2,4-triazoles or 1-H-tetrazoles such as phenylmercaptotetrazole as described in U.S. Pat. No. 4,220,709 (deMauriac), and silver salts of imidazoles and imidazole derivatives as described in U.S. Pat. No. 4,260,677 (Winslow et al.). Moreover, silver salts of acetylenes can also be used as described, for example in U.S. Pat. No. 4,761,361 (Ozaki et al.) and U.S. Pat. No. 4,775,613 (Hirai et al.).

It is also convenient to use silver half soaps. A preferred example of a silver half soap is an equimolar blend of silver carboxylate and carboxylic acid, which analyzes for about 14.5% by weight solids of silver in the blend and which is prepared by precipitation from an aqueous solution of an ammonium or an alkali metal salt of a commercial fatty carboxylic acid, or by addition of the free fatty acid to the silver soap. For transparent films a silver carboxylate full soap, containing not more than about 15% of free fatty carboxylic acid and analyzing for about 22% silver, can be used. For opaque thermographic materials, different amounts can be used.

The methods used for making silver soap emulsions are well known in the art and are disclosed in *Research Disclosure*, April 1983, item 22812, *Research Disclosure*, October 1983, item 23419, U.S. Pat. No. 3,985,565 (Gabrielsen et al.) and the references cited above.

Non-photosensitive sources of reducible silver ions can also be provided as core-shell silver salts such as those described in commonly assigned and copending U.S. Ser. No. 09/761,954 (filed Jan. 17, 2001 by Whitcomb and Pham), that is incorporated herein by reference. These silver salts include a core comprised of one or more silver salts and a shell having one or more different silver salts.

Still another useful source of non-photosensitive reducible silver ions in the practice of this invention are the silver dimer compounds that comprise two different silver salts as described in copending U.S. Ser. No. 09/812,597 (filed Mar. 20, 2001 by Whitcomb), that is incorporated herein by reference. Such non-photosensitive silver dimer compounds comprise two different silver salts, provided that when the two different silver salts comprise straight-chain, saturated hydrocarbon groups as the silver coordinating ligands, those ligands differ by at least 6 carbon atoms.

Yet another useful source of non-photosensitive reducible silver ions in the practice of this invention are those having certain crystalline properties as measured by the ratios of the peak heights of their X-ray diffraction lines. Such silver salts are described in U.S. Pat. No. 6,096,486 (Emmers et al.) and U.S. Pat. No. 6,159,667 (Emmers et al.), both incorporated herein by reference.

The one or more non-photosensitive sources of reducible silver ions are preferably present in an amount of about 5% by weight to about 70% by weight, and more preferably, about 10% to about 50% by weight, based on the total dry weight of the thermographic imaging layers. Stated another way, the amount of the sources of reducible silver ions is generally present in an amount of from about 0.001 to about 0.2 mol/m$^2$ of the dry thermographic material, and preferably from about 0.005 to about 0.02 mol/m$^2$ of that material.

Reducing Agents

The reducing agent (or reducing agent composition comprising two or more components) for the non-photosensitive source of reducible silver ions can be any material, preferably an organic material, that can reduce silver (I) ion to metallic silver. Suitable organic reducing agents for the reduction of the non-photosensitive silver salts are organic compounds containing at least one active hydrogen atom linked to oxygen, nitrogen or carbon, Conventional photographic developers can be used as reducing agents, including aromatic di- and tri-hydroxy compounds (such as hydroquinones, gallatic acid and gallic acid derivatives, catechols, and pyrogallols), aminophenols (for example, N-methylaminophenol), p-phenylenediamines, alkoxynaphthols (for example, 4-methoxy-1-naphthol), pyrazolidin-3-one type reducing agents (for example PHENIDONE), pyrazolin-5-ones, polyhydroxy spiro-bis-indanes, indan-1,3-dione derivatives, hydroxytetrone acids, hydroxytetronimides, hydroxylamine derivatives such as for example those described in U.S. Pat. No. 4,082,901, hydrazine derivatives, hindered phenols, amidoximes, azines, reductones (for example, ascorbic acid and ascorbic acid derivatives), leuco dyes, and other materials readily apparent to one skilled in the art.

Preferred reducing agents are aromatic di- and tri-hydroxy compounds having at least two hydroxy groups in ortho- or para-relationship on the same aromatic nucleus. Examples are hydroquinone and substituted hydroquinones, catechols, pyrogallol, gallic acid and gallic acid esters (for example, methyl gallate, ethyl gallate, propyl gallate), and tannic acid.

Particularly preferred are reducing catechol-type reducing agents having no more than two hydroxy groups in an ortho-relationship. Preferred catechol-type reducing agents include, for example, catechol, 3-(3,4-dihydroxy-phenyl)-propionic acid, 2,3-dihydroxy-benzoic acid, 2,3-dihydroxy-benzoic acid esters, 3,4-dihydroxy-benzoic acid, and 3,4-dihydroxy-benzoic acid esters.

One particularly preferred class of catechol-type reducing agents are benzene compounds in which the benzene nucleus is substituted by no more than two hydroxy groups which are present in 2,3-position on the nucleus and have in the 1-position of the nucleus a substituent linked to the nucleus by means of a carbonyl group. Compounds of this type include 2,3-dihydroxy-benzoic acid, methyl 2,3-dihydroxy-benzoate, and ethyl 2,3-dihydroxy-benzoate.

Another particularly preferred class of catechol-type reducing agents are benzene compounds in which the benzene nucleus is substituted by no more than two hydroxy groups which are present in 3,4-position on the nucleus and have in the 1-position of the nucleus a substituent linked to the nucleus by means of a carbonyl group. Compounds of this type include, for example, 3,4-dihydroxy-benzoic acid, methyl 3,4-dihydroxy-benzoate, ethyl 3,4-dihydroxy-benzoate, 3,4-dihydroxy-benzaldehyde, and phenyl-(3,4-dihydroxyphenyl)ketone. Such compounds are described, for example, in U.S. Pat. No. 5,582,953 (Uyttendaele et al.).

Still another particularly useful class of reducing agents are polyhydroxy spiro-bis-indane compounds described as photographic tanning agents in U.S. Pat. No. 3,440,049 (Moede). Examples include 3,3,3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1'-spiro-bis-indane (called indane II).

Hindered phenol reducing agents are also useful (alone or in combination with one or more high contrast co-developing agents and co-developer contrast-enhancing agents). These are compounds that contain only one hydroxy group on a given phenyl ring and have at least one additional substituent located ortho to the hydroxy group. Hindered phenol developers may contain more than one hydroxy group as long as each hydroxy group is located on different phenyl rings. Hindered phenol developers include, for example, binaphthols (that is dihydroxybinaphthyls), biphenols (that is dihydroxybiphenyls), bis(hydroxynaphthyl) methanes, bis(hydroxyphenyl)methanes, and hindered naphthols, each of which may be variously substituted.

Representative binaphthols include, but are not limited to, 1,1'-bi-2-naphthol, 1,1'-bi-4-methyl-2-naphthol, and 6,6'-dibromo-bi-2-naphthol. For additional compounds see U.S.

Pat. No. 3,094,417 (Workman) and U.S. Pat. No. 5,262,295 (Tanaka et al.), both incorporated herein by reference.

Representative biphenols include, but are not limited to, 2,2'-dihydroxy-3,3'-di-t-butyl-5,5-dimethylbiphenyl, 2,2'-dihydroxy-3,3',5,5'-tetra-t-butylbiphenyl, 2,2'-dihydroxy-3, 3'-di-t-butyl-5,5'-dichloro-biphenyl, 2-(2-hydroxy-3-t-butyl-5-methylphenyl)-4-methyl-6-n-hexylphenol, 4,4'-dihydroxy-3,3',5,5'-tetra-t-butylbiphenyl and 4,4'-dihydroxy-3,3',5,5'-tetramethylbiphenyl. For additional compounds see U.S. Pat. No. 5,262,295 (noted above).

Representative bis(hydroxynaphthyl)methanes include, but are not limited to, 4,4'-methylenebis(2-methyl-1-naphthol). For additional compounds see U.S. Pat. No. 5,262,295 (noted above).

Representative bis(hydroxyphenyl)methanes include, but are not limited to, bis(2-hydroxy-3-t-butyl-5-methylphenyl) methane (CAO-5), 1,1'-bis(2-hydroxy-3,5-dimethylphenyl)-3,5,5-trimethylhexane (NONOX or PERMANAX WSO), 1,1'-bis(3,5-di-t-butyl-4-hydroxyphenyl)methane, 2,2'-bis (4-hydroxy-3-methylphenyl)propane, 4,4'-ethylidene-bis(2-t-butyl-6-methylphenol), 2,2'-isobutylidene-bis(4,6-dimethylphenol) (LOWINOX 221B46), and 2,2'-bis(3,5-dimethyl-4-hydroxyphenyl)propane. For additional compounds see U.S. Pat. No. 5,262,295 (noted above).

Representative hindered phenols include, but are not limited to, 2,6-di-t-butylphenol, 2,6-di-t-butyl-4-methylphenol, 2,4-di-t-butylphenol, 2,6-dichlorophenol, 2,6-dimethylphenol and 2-t-butyl-6-methylphenol.

Representative hindered naphthols include, but are not limited to, 1-naphthol, 4-methyl-1-naphthol, 4-methoxy-1-naphthol, 4-chloro-1-naphthol and 2-methyl-1-naphthol, For additional compounds see U.S. Pat. No. 5,262,295 (noted above).

More specific alternative reducing agents that have been disclosed in dry silver systems include amidoximes such as phenylamidoxime, 2-thienyl-amidoxime and p-phenoxyphenylamidoxime, azines (for example, 4-hydroxy-3,5-dimethoxybenzaldehydrazine), a combination of aliphatic carboxylic acid aryl hydrazides and ascorbic acid, such as 2,2'-bis(hydroxymethyl)-propionyl-β-phenyl hydrazide in combination with ascorbic acid, a combination of polyhydroxybenzene and hydroxylamine, a reductone and/or a hydrazine [for example, a combination of hydroquinone and bis(ethoxyethyl)hydroxylamine], piperidinohexose reductone or formyl-4-methylphenylhydrazine, hydroxamic acids (such as phenylhydroxamic acid, p-hydroxyphenylhydroxamic acid, and o-alaninehydroxamic acid), a combination of azines and sulfonamidophenols (for example, phenothiazine and 2,6-dichloro-4-benzenesulfonamidophenol), α-cyanophenyl-acetic acid derivatives (such as ethyl α-cyano-2-methylphenylacetate and ethyl-α-cyanophenylacetate), bis-o-naphthols [such as 2,2'-dihydroxyl-1-binaphthyl, 6,6'-dibromo-2,2'-dihydroxy-1,1'-binaphthyl, and bis(2-hydroxy-1-naphthyl)-methane], a combination of bis-o-naphthol and a 1,3-dihydroxybenzene derivative (for example, 2,4-dihydroxybenzophenone or 2,4-dihydroxyacetophenone), 5-pyrazolones such as 3-methyl-1-phenyl-5-pyrazolone, reductones (such as dimethylamino-hexose reductone, anhydrodihydro-aminohexose reductone and anhydrodihydro-piperidone-hexose reductone), sulfonamidophenol reducing agents (such as 2,6-dichloro-4-benzenesulfonamido-phenol, and p-benzenesulfonamidophenol), 2-phenylindane-1,3-dione and similar compounds, chromans (such as 2,2-dimethyl-7-t-butyl-6-hydroxychroman), 1,4-dihydropyridines (such as 2,6-dimethoxy-3,5-dicarbethoxy-1,4-dihydropyridine), ascorbic acid derivatives (such as 1-ascorbylpalmitate, ascorbylstearate and unsaturated aldehydes and ketones), 3-pyrazolidones, and certain indane-1,3-diones.

An additional class of reducing agents that can be used as developers are substituted hydrazines including the sulfonyl hydrazides described in U.S. Pat. No. 5,464,738 (Lynch et al.). Still other useful reducing agents are described for example, in U.S. Pat. No. 3,074,809 (Owen), U.S. Pat. No. 3,094,417 (Workman), U.S. Pat. No. 3,080,254 (Grant, Jr.) and U.S. Pat. No. 3,887,417 (Klein et al.). Auxiliary reducing agents may be useful as described in U.S. Pat. No. 5,981,151 (Leenders et al.). All of these patents are incorporated herein by reference.

In some instances, the reducing agent composition comprises two or more components such as a di- and tri-hydroxy reducing agent and a co-developer that can be chosen from the various classes of reducing agents described below. Ternary developer mixtures involving the further addition of contrast enhancing agents are also useful. Such contrast enhancing agents can be chosen from the various classes described below. The co-developers and contrast enhancing agents may be present in the thermographic emulsion layer (s) or in a layer(s) adjacent to the thermographic emulsion layer(s).

Useful co-developer reducing agents can also be used as described for example, in copending U.S. Ser. No. 09/239, 182 (filed Jan. 28, 1999 by Lynch and Skoog), incorporated herein by reference. Examples of these compounds include, but are not limited to, 2,5-dioxo-cyclopentane carboxaldehydes, 5-(hydroxymethylene)-2,2-dimethyl-1,3-dioxane-4,6-diones, 5-(hydroxymethylene)-1,3-dialkylbarbituric acids, and 2-(ethoxymethylene)-1H-indene-1,3(2H)-diones.

Additional classes of reducing agents that can be used as co-developers are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional developers are described in U.S. Pat. No. 6,100,022 (Inoue et al.). All of the patents above are incorporated herein by reference.

Yet another class of co-developers includes substituted acrylonitrile compounds that are described in U.S. Pat. No. 5,635,339 (Murray) and U.S. Pat. No. 5,545,515 (Murray et al.), both incorporated herein by reference. Examples of such compounds include, but are not limited to, the compounds identified as HET-01 and HET-02 in U.S. Pat. No. 5,635,339 (noted above) and CN-01 through CN-13 in U.S. Pat. No. 5,545,515 (noted above). Particularly useful compounds of this type are (hydroxymethylene)cyanoacetates and their metal salts.

Various contrast enhancers can be used in some thermographic materials with specific co-developers. Examples of useful contrast enhancers include, but are not limited to, hydroxylamines (including hydroxylamine and alkyl- and aryl-substituted derivatives thereof), alkanolamines and ammonium phthalamate compounds as described for example, in U.S. Pat. No. 5,545,505 (Simpson), hydroxamic acid compounds as described for example, in U.S. Pat. No. 5,545,507 (Simpson et al.), N-acylhydrazine compounds as described for example, in U.S. Pat. No. 5,558,983 (Simpson et al.), and hydrogen atom donor compounds as described in U.S. Pat. No. 5,637,449 (Harring et al.). All of the above patents are incorporated herein by reference.

For color imaging materials (for example, monochrome, dichrome, or full color images) or for black-and-white images one or more reducing agents can be used that can be oxidized directly or indirectly to form or release one or more dyes.

The dye-forming or releasing compound may be any colored, colorless or lightly colored compound that can be oxidized to a colored form, or to release a preformed dye when heated, preferably to a temperature of from about 80° C. to about 250° C. for a duration of at least 1 second. When used with a dye- or image-receiving layer, the dye can diffuse through the imaging layers and interlayers into the image-receiving layer of the thermographic material.

Leuco dyes or "blocked" leuco dyes are one class of dye-forming compounds (or "blocked" dye-forming compounds) that form and release a dye upon oxidation by silver ion to form a visible color image in the practice of the present invention. Leuco dyes are the reduced form of dyes that are generally colorless or very lightly colored in the visible region (optical density of less than 0.2). Thus, oxidation provides a color change that is from colorless to colored, or an optical density increase of at least 0.2 units or a substantial change in hue.

Representative classes of useful leuco dyes include, but are not limited to, chromogenic leuco dyes (such as indoaniline, indophenol, or azomethine dyes), imidazole leuco dyes such as 2-(3,5-di-t-butyl-4-hydroxy-phenyl)-4,5-diphenylimidazole as described for example in U.S. Pat. No. 3,985,565 (Gabrielson et al.), dyes having an azine, diazine, oxazine, or thiazine nucleus such as those described for example in U.S. Pat. No. 4,563,415 (Brown et al.), U.S. Pat. No. 4,622,395 (Bellus et al.), U.S. Pat. No. 4,710,570 (Thien), and U.S. Pat. No. 4,782,010 (Mader et al.), and benzlidene leuco compounds as described for example in U.S. Pat. No. 4,932,792 (Grieve et al.), all incorporated herein by reference. Further details about the chromogenic leuco dyes noted above can be obtained from U.S. Pat. No. 5,491,059 (noted above, Column 13) and references noted therein.

Another useful class of leuco dyes are what are known as "aldazine" and "ketazine" leuco dyes, which are described for example in U.S. Pat. No. 4,587,211 (Ishida et al.) and U.S. Pat. No. 4,795,697 (Vogel et al.), both incorporated herein by reference.

Still another useful class of dye-releasing compounds are those that release diffusible dyes upon oxidation. These are known as preformed dye release (PDR) or redox dye release (RDR) compounds. In such compounds, the reducing agents release a mobile preformed dye upon oxidation. Examples of such compounds are described in U.S. Pat. No. 4,981,775 (Swain), incorporated herein by reference.

Further, other useful image-forming compounds are those in which the mobility of a dye moiety changes as a result of an oxidation-reduction reaction with silver halide, or a nonphotosensitive silver salt at high temperature, as described for example in JP Kokai 165,054/84.

Still further the reducing agent can be a compound that releases a conventional photographic dye forming color coupler or developer upon oxidation as is known in the photographic art.

In addition to silver based thermographic materials, thermographic materials based on other chemistries can be prepared by the methods described herein, such as for example, leuco dye oxidation systems wherein a thermally sensitive composition capable of undergoing a visible change upon the application of heat and comprising an oxidatively triggerable leuco dye and a stable oxidizing acid. Such leuco dye oxidation systems are described in U.S. Pat. No. 5,145,767 (Whitcomb et al.).

Still additionally, thermal imaging constructions comprising acid developable color-forming compounds, an acidic developer, and binder can be prepared. Commonly used classes of color-forming compounds this type of thermal imaging include fluorans, rhodamines, and triarylmethane lactone color-forming compounds. All of these compounds react with acidic developers, such as Lewis acids, salicylic acids, phenolic compounds, or acidic clays, to form highly colored species by the opening of a lactone ring. Specific, examples of such compounds are Pergascript Black I-R (a fluoran) and crystal violet lactone (a triarylmethane lactone). Such acid developable color-forming systems are described in, for example, U.S. Pat. No. 5,670,446 (Jubran et al.)

The dyes that are formed or released can be the same in the same or different imaging layers. A difference of at least 60 nm in reflective maximum absorbance is preferred. More preferably, this difference is from about 80 to about 100 nm. Further details about the various dye absorbances are provided in U.S. Pat. No. 5,491,059 (noted above, Col. 14).

The total amount of one or more dye-forming or releasing compound that can be incorporated into the thermographic materials of this invention is generally from about 0.5 to about 25 weight % of the total weight of each imaging layer in which they are located. Preferably, the amount in each imaging layer is from about 1 to about 10 weight %, based on the total dry layer weight. The useful relative proportions of the leuco dyes would be readily known to a skilled worker in the art.

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Any co-developers may be present generally in an amount of from about 0.001% to about 1.5% (dry weight) of the emulsion layer coating.

Other Addenda

The thermographic materials of this invention can also contain other additives such as shelf-life stabilizers, toners, antifoggants, contrast enhancers, development accelerators, post-processing stabilizers, stabilizer precursors or development inactivators, and other image-modifying agents as would be readily apparent to one skilled in the art.

The thermographic materials can be further protected against the production of fog and can be stabilized against loss of sensitivity during storage. While not necessary for the practice of the invention, it may be advantageous to add mercury (II) salts to the emulsion layer(s) as an antifoggant. Preferred mercury (II) salts for this purpose are mercuric acetate and mercuric bromide. Other useful mercury salts include those described in U.S. Pat. No. 2,728,663 (Allen).

Other suitable antifoggants and stabilizers that can be used alone or in combination include thiazolium salts as described in U.S. Pat. No. 2,131,038 (Staud) and U.S. Pat. No. 2,694,716 (Allen), azaindenes as described in U.S. Pat. No. 2,886,437 (Piper), triazaindolizines as described in U.S. Pat. No. 2,444,605 (Heimbach), the urazoles described in U.S. Pat. No. 3,287,135 (Anderson), sulfocatechols as described in U.S. Pat. No. 3,235,652 (Kennard), the oximes described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder), compounds having —$SO_2CBr_3$ groups as described for example in U.S. Pat. No. 5,594,143 (Kirk et al.) and U.S. Pat. No. 5,374,514 (Kirk et al.), and 2-(tribromomethylsulfonyl)quinoline compounds as described in U.S. Pat. No. 5,460,938 (Kirk et al.). Stabilizer precursor compounds capable of releasing stabilizers upon application of heat during development can also be used. Such precursor compounds are described in for example, U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzotriazoles (for example alkylsulfonylbenzotriazoles and arylsulfonylbenzotriazoles) have been found to be useful stabilizing compounds (such as for post-processing print stabilizing), as described in U.S. Pat. No. 6,171,767 (Kong et al.).

Furthermore, other specific useful antifoggants/stabilizers are described in more detail in U.S. Pat. No. 6,083,681 (Lynch et al.).

Other antifoggants are hydrobromic acid salts of heterocyclic compounds (such as pyridinium hydrobromide perbromide) as described, for example, in U.S. Pat. No. 5,028,523 (Skoug), benzoyl acid compounds as described, for example, in U.S. Pat. No. 4,784,939 (Pham), substituted propenenitrile compounds as described, for example, in U.S. Pat. No. 5,686,228 (Murray et al.), silyl blocked compounds as described, for example, in U.S. Pat. No. 5,358,843 (Sakizadeh et al.), vinyl sulfones as described, for example, in EP-A-0 600,589 (Philip, Jr. et al.) and EP-A-0 600,586 (Philip, Jr. et al.), and tribromomethylketones as described, for example, in EP-A-0 600,587 (Oliff et al.).

Preferably, the thermographic materials include one or more polyhalo antifoggants that include one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds.

Particularly useful antifoggants are polyhalo antifoggants, such as those having a —$SO_2C(X')_3$ group wherein X' represents the same or different halogen atoms.

The thermographic materials of this invention can contain development accelerators such as 3-indazolinone and urea compounds that function as thermally sensitive reducing agents and as development accelerators for the thermally sensitive reducible source of silver. Such materials are described in U.S. Pat. No. 5,275,932 (Weigel et al.), incorporated herein by reference.

The thermographic materials of this invention can be protected against further reaction upon light exposure by the incorporation of stabilizers containing 1,2,4-triazole compounds having at least one nitrogen atom having a hydrogen atom and none of the carbon atoms being part of a thione group, the compound not being annulated with an aromatic ring system. Such stabilizer compounds are described in U.S. Pat. No. 5,750,319 (Horsten et al.) incorporated herein by reference.

The thermographic materials of this invention can be further protected against the formation of background fog or coloration after thermal imaging by incorporating at least one colorless photo-oxidizing substance that upon exposure to ultraviolet radiation, such as present in daylight or artificial lighting, yields free radicals capable of inactivating the reducing agent and thereby rendering the reducing agent(s) incapable of reducing the organic silver salt to silver. Such substances are described in U.S. Pat. No. 5,637,550 (Leenders et al.) and incorporated herein by reference.

In order to obtain a neutral black image tone in the higher density areas, and a neutral gray image tone in the lower density areas the it is highly desirable to incorporate "toners" into the thermographic materials of this invention. Preferably, if used, a toner can be present in an amount of about 0.01% by weight to about 10%, and more preferably about 0.1% by weight to about 10% by weight, based on the total dry weight of the layer in which it is included. Toners may be incorporated in the thermographic imaging layer or in an adjacent layer. Toners are well known materials in the thermographic art, as shown in U.S. Pat. No. 3,080,254 (Grant, Jr.), U.S. Pat. No. 3,847,612 (Winslow), U.S. Pat. No. 4,123,282 (Winslow), U.S. Pat. No. 4,082,901 (Laridon et al.), U.S. Pat. No. 3,074,809 (Owen), U.S. Pat. No. 3,446,648 (Workman), U.S. Pat. No. 3,844,797 (Willems et al.), U.S. Pat. No. 3,951,660 (Hagemann et al.), U.S. Pat. No. 5,599,647 (Defieuw et al.), and GB 1,439,478 (AGFA), all incorporated herein by reference.

Examples of toners include, but are not limited to, phthalimide and N-hydroxyphthalimide, cyclic imides (such as succinimide), pyrazoline-5-ones, quinazolinone, 1-phenylurazole, 3-phenyl-2-pyrazoline-5-one, and 2,4-thiazolidinedione, naphthalimides (such as N-hydroxy-1,8-naphthalimide), cobalt complexes [such as hexaaminecobalt (3+) trifluoroacetate], mercaptans (such as 3-mercapto-1,2,4-triazole, 2,4-dimercaptopyrimidine, 3-mercapto-4,5-diphenyl-1,2,4-triazole and 2,5-dimercapto-1,3,4-thiadiazole), N-(aminomethyl)aryldicarboximides (such as (N,N-dimethylaminomethyl)phthalimide), and N-(dimethylaminomethyl)naphthalene-2,3-dicarboximide, a combination of blocked pyrazoles, isothiuronium derivatives, and certain photobleach agents [such as a combination of N,N'-hexamethylene-bis(1-carbamoyl-3,5-dimethylpyrazole), 1,8-(3,6-diazaoctane)bis(isothiuronium) trifluoroacetate, and 2-(tribromomethylsulfonyl benzothiazole)], merocyanine dyes {such as 3-ethyl-5-[(3-ethyl-2-benzothiazolinylidene)-1-methyl-ethylidene]-2-thio-2,4-o-azolidine-dione}, phthalazine and derivatives thereof [such as those described in U.S. Pat. No. 6,146,822 (Asanuma et al.)], phthalazinone and phthalazinone derivatives, or metal salts or these derivatives [such as 4-(1-naphthyl)phthalazinone, 6-chlorophthalazinone, 5,7-dimethoxyphthalazinone, and 2,3-dihydro-1,4-phthalazinedione], a combination of phthalazine (or derivative thereof) plus one or more phthalic acid derivatives (such as phthalic acid, 4-methylphthalic acid, 4-nitrophthalic acid, and tetrachlorophthalic anhydride), quinazolinediones, benzoxazine or naphthoxazine derivatives, rhodium complexes functioning not only as tone modifiers but also as sources of halide ion for silver halide formation in situ [such as ammonium hexachlororhodate (III), rhodium bromide, rhodium nitrate, and potassium hexachlororhodate (III)], benzoxazine-2,4-diones (such as 1,3-benzoxazine-2,4-dione, 8-methyl-1,3-benzoxazine-2,4-dione and 6-nitro-1,3-benzoxazine-2,4-dione), pyrimidines and asym-triazines (such as 2,4-dihydroxypyrimidine, 2-hydroxy-4-aminopyrimidine and azauracil) and tetraazapentalene derivatives [such as 3,6-dimercapto-1,4-diphenyl-1H,4H-2,3a,5,6a-tetraazapentalene and 1,4-di-(o-chlorophenyl)-3,6-dimercapto-1H,4H-2,3a,5,6a-tetraazapentalene].

Particularly useful toners are phthalazines and phthalazine derivatives, such as those described in U.S. Pat. No. 6,146,822 (noted above), phthalazinones and phthalazinone derivatives and progenitors, such as those described in U.S. Pat. Nos. 3,080,254 and 3,446,648 (both noted above), and benzoxazine-2,4-diones, naphthoxazine-2,4-diones and their derivatives, such as those described in U.S. Pat. Nos. 3,951,660 and 5,599,647 (noted above).

Binders

The non-photosensitive source of reducible silver ions, the reducing agent composition, and any other additives used in the thermographic imaging layer are generally added to one or more binders that are either hydrophilic or hydrophobic. Thus, either aqueous or solvent-based formulations can be used to prepare the thermographic materials of this invention. Mixtures of either or both types of binders can also be used. It is preferred that the binder be selected from hydrophobic polymeric materials, such as, for example, natural and synthetic resins that are sufficiently polar to hold the other ingredients in solution or suspension.

Examples of typical hydrophobic binders include, but are not limited to, polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal) and vinyl copolymers (such as polyvinyl acetate and polyvinyl chloride) are particularly preferred. Particularly suitable binders are polyvinyl butyral resins that are available as BUTVAR® B79 (Solutia, Inc.) and PIOLOFORM® BS-18 or PIOLOFORM® BL-16 (Wacker Chemical Company). Aqueous dispersions (or latices) of hydrophobic binders may also be used.

Examples of useful hydrophilic binders include, but are not limited to, gelatin and gelatin-like derivatives (hardened or unhardened), cellulosic materials such as hydroxymethyl cellulose, acrylamide/methacrylamide polymers, acrylic/methacrylic polymers polyvinyl pyrrolidones, polyvinyl alcohols, and polysaccharides (such as dextrans and starch ethers).

Hardeners for various binders may be present if desired. Useful hardeners are well known and include diisocyanate compounds as described for example, in EP-0 600 586B1 and vinyl sulfone compounds as described in EP-0 600 589B1.

Where the proportions and activities of the thermographic materials require a particular developing time and temperature, the binder(s) should be able to withstand those conditions. Generally, it is preferred that the binder does not decompose or lose its structural integrity at 120° C. for 60 seconds. It is more preferred that it does not decompose or lose its structural integrity at 177° C. for 60 seconds.

The polymer binder(s) is used in an amount sufficient to carry the components dispersed therein. The effective range can be appropriately determined by one skilled in the art. Preferably, a binder is used at a level of about 10% by weight to about 90% by weight, and more preferably at a level of about 20% by weight to about 70% by weight, based on the total dry weight of the layer in which it is included.

Support Materials

The thermographic materials can be prepared using a polymeric support that is preferably a flexible, transparent film that has any desired thickness and is composed of one or more polymeric materials, depending upon their use. The supports are generally transparent (especially if the material is used as a photomask) or at least translucent, but in some instances, opaque supports may be useful. They are required to exhibit dimensional stability during thermal development and to have suitable adhesive properties with overlying layers. Useful polymeric materials for making such supports include, but are not limited to, polyesters (such as polyethylene terephthalate and polyethylene naphthalate), cellulose acetate and other cellulose esters, polyvinyl acetal, polyolefins (such as polyethylene and polypropylene), polycarbonates, and polystyrenes (and polymers of styrene derivatives). Preferred supports are composed of polymers having good heat stability, such as polyesters and polycarbonates. Polyethylene terephthalate film is the most preferred support. Various support materials are described, for example, in Research Disclosure, August 1979, item 18431. A method of making dimensionally stable polyester films is described in Research Disclosure, September, 1999, item 42536. Support materials may also be treated or annealed to reduce shrinkage and promote dimensional stability.

Opaque supports can also be used such as dyed polymeric films and resin-coated papers that are stable to high temperatures.

Support materials can contain various colorants and/or pigments, if desired. Support materials may be treated using conventional procedures (such as corona discharge) to improve adhesion of overlying layers, or subbing or other adhesion-promoting layers can be used. Useful subbing layer formulations include those conventionally used for photographic materials such as vinylidene halide polymers.

Thermographic Formulations

The formulation for the thermographic emulsion layer(s) can be prepared by dissolving and dispersing the binder, the non-photosensitive source of reducible silver ions, the reducing composition, and optional addenda in an organic solvent, such as toluene, 2-butanone, acetone or tetrahydrofuran.

Alternatively, these components can be formulated with a hydrophilic binder in water or in water-organic solvent mixtures to provide aqueous-based coating formulations.

Thermographic materials can contain plasticizers and lubricants such as polyalcohols and diols of the type described in U.S. Pat. No. 2,960,404 (Milton et al.), fatty acids or esters such as those described in U.S. Pat. No. 2,588,765 (Robijns) and U.S. Pat. No. 3,121,060 (Duane), and silicone resins such as those described in GB 955,061 (DuPont). The materials can also contain matting agents such as starch, titanium dioxide, zinc oxide, silica, and polymeric beads including beads of the type described in U.S. Pat. No. 2,992,101 (Jelley et al.) and U.S. Pat. No. 2,701,245 (Lynn). Polymeric fluorinated surfactants may also be useful in one or more layers of the thermographic materials for various purposes, such as improving coatability and optical density uniformity as described in U.S. Pat. No. 5,468,603 (Kub).

The thermographic materials can include antistatic or conducting layers. Such layers may contain soluble salts (for example chlorides or nitrates), evaporated metal layers, or ionic polymers such as those described in U.S. Pat. No. 2,861,056 (Minsk) and U.S. Pat. No. 3,206,312 (Sterman et al.), or insoluble inorganic salts such as those described in U.S. Pat. No. 3,428,451 (Trevoy), electro-conductive underlayers such as those described in U.S. Pat. No. 5,310,640 (Markin et al.), electronically-conductive metal antimonate particles such as those described in U.S. Pat. No. 5,368,995 (Christian et al.), and electrically-conductive metal-containing particles dispersed in a polymeric binder such as those described in EP-A-0 678 776 (Melpolder et al.). Other antistatic agents are well known in the art.

The thermographic materials can be constructed of two or more layers on a support. Two-layer materials would having an imaging layer that contains the non-photosensitive source of reducible silver ions, the reducing composition, the binder, as well as optional materials such as toners, coating aids, and other adjuvants. The imaging layer would be disposed over the adhesion-promoting layer described herein.

Three-layer constructions would comprise two thermographic imaging layers containing all the ingredients needed for imaging distributed in one or both layers and an adhesion-promoting layer. Alternatively, the construction could include a single thermographic imaging layer, an adhesion-promoting layer, and a protective topcoat over both layers.

Layers to promote adhesion of one layer to another are also known, as described for example in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described for example in U.S. Pat. No. 5,928,857 (Geisler et al.). Such materials would be used in addition to the adhesion-promoting layer described above.

Layers to reduce emissions from the film may also be present, including the polymeric barrier layers described in copending U.S. Ser. No. 09/728,416 (filed Dec. 1, 2000 by Kenney, Skoug, Ishida, and Wallace), U.S. Ser. No. 09/821,983 (filed Mar. 30, 2001 by Bauer, Horch, Miller, Yacobuci, and Ishida), and U.S. Ser. No. 09/916,366 (filed Jul. 27, 2001 by Bauer, Horch, Miller, Teegarden, Hunt, and Sakizadeh), all incorporated herein by reference.

The present invention may also include a protective topcoat layer that may be coated at the same time as the thermographic imaging layer and the non-imaging adhesion-promoting layer. Topcoat layers are useful to prevent deformation and reduce scratching of the thermographic material, as well as to prevent abrasion and damage of the thermal imaging heads.

The protective topcoat layer preferably comprises a binder, which may be hydrophobic (organic solvent-soluble) or hydrophilic (water-soluble). Useful binders are polycarbonates as described in U.S. Pat. No. 5,759,752 (Uyttendaele et al.), cellulose nitrate and substituted cellulose nitrates as described in U.S. Pat. No. 5,416,058 (Uyttendaele et al.), polyacrylate s (for example, polymethyl methacrylate), polyvinyl acetals (for example, polyvinyl butyral), vinyl polymers (such as polyvinyl alcohol and polyvinyl naphthalene), and cellulosic polymers (for example, cellulose acetate, cellulose acetate butyrate, and cellulose acetate propionate). The protective topcoat layer may further contain additives such as calcined china clay as described in U.S. Pat. No. 5,547,914 (De Mutter et al.), thermomeltable particles (such as waxes) dispersed in polymeric binders as described in U.S. Pat. No. 5,587,350 (Horsten et al.), matting agents that of a size that protrude from the protective topcoat (such as particles of silicones, talc, alumina, various silicates, polymethyl methacrylate, and polyacrylate) as described in U.S. Pat. No. 5,536,696 (Horsten et al.), and acidic and neutral silica as described in U.S. Pat. No. 6,051,530 (Defieuw et al.). The topcoat layer can also contain lubricants such as the phosphoric acid solid/liquid lubricant mixture described in U.S. Pat. No. 5,959,953 (Defieuw et al.). All of the above patents are incorporated herein by reference.

Thermographic formulations described can be coated by various coating procedures including wire wound rod coating, dip coating, air knife coating, curtain coating, forward and reverse roll coating, gravure coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), U.S. Pat. No. 5,861,195 (Bhave et al.), and GB 837,095 (Ilford). A typical coating gap for the thermographic imaging layer can be from about 10 $\mu$m to about 750 $\mu$m, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by a MacBeth Color Densitometer Model TD 504.

Mottle and other surface anomalies can be reduced in the materials of this invention by incorporation of a fluorinated polymer as described for example in U.S. Pat. No. 5,532,121 (Yonkoski et al.) or by using particular drying techniques as described, for example in U.S. Pat. No. 5,621,983 (Ludemann et al.).

Preferably, two or more layers are applied to a film support using slide coating. The first layer can be coated on top of the second layer while the second layer is still wet. The first and second fluids used to coat these layers can be the same or different organic solvents (or organic solvent mixtures).

While the first and second layers can be coated on one side of the film support, manufacturing methods can also include forming on the opposing or backside of said polymeric support, one or more additional layers, including an antistatic layer, or a layer containing a matting agent (such as silica), or a combination of such layers.

In preferred embodiments of the coating method, the wet coating thickness of the adhesion-promoting layer ("second or non-imaging" and "fourth" layers) is generally less than 50 $\mu$m, and preferably from about 0.1 $\mu$m to about 20 $\mu$m.

While the noted layers (including a thermographic layer) can be coated on one side of the film support, the method can also include forming on the opposing side of said polymeric support, C) a fourth layer out of a fourth fluid predominantly comprising a fourth organic solvent, the fourth layer containing no silver, and D) a third layer comprising at least one polymer out of a third fluid predominantly comprising a third organic solvent, the fourth layer comprising two or more polymers that form a single phase mixture, the two or more polymers in the fourth layer including a third polymer serving to promote adhesion between the polymeric support and the fourth layer, and a fourth polymer that is chosen from one of the polymer classes noted above.

In such embodiments, the third layer can be an antistatic layer or a layer containing a matting agent (such as silica).

Moreover, in preferred embodiments, the two frontside layers of such materials can comprise a polyvinyl acetal or a polyester resin, and the third and fourth layer can independently comprise a polyester resin or a cellulosic polymer.

Imaging Conditions

Thermographic materials can be imaged using known procedures and conditions at a suitably elevated temperature. Thus, an image can be provided by imagewise heating the material at a moderately elevated temperature of, for example, from about 80° C. to about 250° C. (preferably from about 100° C. to about 200° C.) for a sufficient period of time, generally from about 1 to about 120 seconds. For example, the image may be developed merely by heating the thermographic material at the above noted temperatures while in contact with an image which itself is in contact with a heat source.

The image may also be developed by impingement with laser radiation or by use of a thermal stylus, thermal print head, or thermal print head array.

Thermographic materials of this invention may also include a dye to facilitate direct development by exposure to laser radiation. Preferably the dye is an infrared absorbing dye and the laser is a diode laser emitting in the infrared. Upon exposure to radiation the radiation absorbed by the dye is converted to heat that develops the thermographic element.

Use as a Photomask

The thermographic materials of the present invention are sufficiently transmissive in the range of from about 350 nm to about 450 nm in non-imaged areas to allow their use in a method where there is a subsequent exposure of an ultraviolet or short wavelength visible radiation sensitive imageable medium. For example, imaging the thermographic material and subsequent development affords a visible image. The heat-developed thermographic material absorbs ultraviolet or short wavelength visible radiation in the areas where there is a visible image and transmits ultraviolet or short wavelength visible radiation where there is no visible image. The heat-developed material may then be used as a mask and positioned between a source of imaging radiation (such as an ultraviolet or short wavelength visible radiation energy source) and an imageable material that is sensitive to such imaging radiation, such as a photo-polymer, diazo material, photoresist, or photosensitive printing plate. Exposing the imageable material to the imaging radiation through the visible image in the exposed and heat-developed thermographic material provides an image in the imageable material. This method is particularly useful where the imageable medium comprises a printing plate and the thermographic material serves as an imagesetting film.

The following examples are provided to illustrate the practice of this invention, and are not intended to be limiting in any manner. The examples provide exemplary procedures for preparing thermographic materials having improved adhesion that are within the scope of the present invention.

Materials and Methods for Examples:

All materials used in the following examples are readily available from standard commercial sources, such as Aldrich Chemical Co. (Milwaukee Wis.) unless otherwise specified. All percentages are by weight unless otherwise indicated. The following additional terms and materials were used.

ACRYLOID® A-21 is an acrylic copolymer available from Rohm and Haas (Philadelphia, Pa.).

BUTVAR® B-79 is a polyvinyl butyral resin available from Solutia, Inc. (St. Louis, Mo.).

PIOLOFORM® BL-16 and PIOLOFORM® BN-18 are polyvinyl butyral resins available from Wacker Polymer Systems (Adrian, Mich.).

CAB 171-15S is a cellulose acetate butyrate resin available from Eastman Chemical Co (Kingsport, Tenn.).

Dow Coming 550 is a trimethyl terminated dimethyl, phenylmethyl siloxane available from Dow Coming (Midland, Mich.).

3M Type 811 Removable Magic™ Tape is available from 3M Company (St. Paul, Minn.).

VITEL® PE 5833 is a polyester resin available from Bostik Findley (Middleton, Mass.).

Adhesion-promoting polymers useful in the present invention were identified as follows. First of all, polymers (adhesion-promoting or "first" polymers) that adhere to a polyester film support, for example PET, were identified by coating a solution (10 weight %) of the polymer in MEK onto bare polyester film, dried and tested for adhesion as described in ASTM D3359-92a. Secondly, a solution of the tested polymer was blended in a solution of a film-forming polymer to be used in the layer to be adhered to the film support in a suitable solvent for both polymers. The ratio of the two polymers in the resulting solution and the coating weights of each were adjusted so that when a coating was dried, the polymer blend would adhere to the polyester film support. This second adhesion evaluation ranged from "0" (less than 35% adhering to the support) to "5" (perfect adhesion).

After suitable adhesion-promoting polymers were selected, the % solids of the polymer blend was adjusted to obtain the desired rheology for coating.

EXAMPLE 1

A thermographic material was prepared as described below.

Adhesion Promoting Formulation

An adhesion promoting carrier layer formulation was prepared with the following components:

| | |
|---|---|
| 2-Butanone | 86.5 weight % |
| BUTVAR ® B-79 | 12.15 weight % |
| VITEL ® PE 5833 | 1.35 weight % |

Silver Soap Homogenate Formulation

A silver soap thermographic homogenate formulation was prepared with the following components.

| | |
|---|---|
| 2-Butanone | 75.5% |
| Silver Behenate | 24.0% |
| BL-16 Polyvinyl butyral | 0.5% |

The materials were mixed and homogenized by passing twice through a homogenizer at 5000 psi. The materials were cooled between the two passes.

Thermographic Emulsion Formulation

A thermographic emulsion formulation was prepared with the following components. Addition and mixing took place at room temperature with 15 minutes of stirring between addition of each ingredient.

| | |
|---|---|
| Silver soap homogenate | 32.46 weight % |
| 2-Butanone | 44.65 weight % |
| Dow Corning 550 in | 0.04 weight % |
| 2-Butanone | 1.00 weight % |
| Phthalazinone | 0.88 weight % |
| BUTVAR ® B-79 | 19.37 weight % |
| 2,3-Dihydroxybenzoic acid | 1.6 weight % |

Topcoat Formulation

A topcoat formulation was prepared for application over the thermographic emulsion formulation with the following components;

| | |
|---|---|
| 2-Butanone | 77.82 weight % |
| Methanol | 10.18 weight % |
| ACRYLOID ® A-21 | 0.44 weight % |
| CAB 171-15S | 11.56 weight % |

A thermographic material was prepared by slide coating the adhesion-promoting layer (coated as a carrier layer), thermographic emulsion layer, and a topcoat layer onto a 7 mil (177.8 μm) blue tinted poly(ethylene terephthalate) support. The slide coater was a laboratory-size slide coating machine and is similar to a conventional full size slide coating machine. The coated sample was dried in a BLUE M® oven for 5 min at 88° C.

When heated, the material developed to a black color.

COMPARATIVE EXAMPLE 1

A comparative thermographic material was prepared by knife coating without using a carrier layer. The thermographic emulsion and topcoat formulations prepared above were dual-knife coated onto a 7 mil (177.8 μm) blue tinted poly(ethylene terephthalate) support After raising the hinged knives, the support was placed in position on the coater bed. The knives were then lowered and locked into place. The height of the knives was adjusted with wedges controlled by screw knobs and measured with electronic gauges. Knife #1 was raised to 10.3 mil (261.6 μm), the clearance corresponding to the desired thickness of the support plus the wet thickness of thermographic emulsion layer #1. Knife #2 was raised to 11.5 mil (292.1 μm) the height equal to the desired thickness of the support plus the wet thickness of thermographic emulsion layer #1 plus the wet thickness of topcoat layer #2.

Aliquots of solutions #1 and #2 were simultaneously poured onto the support in front of the corresponding knives. The support was immediately drawn past the knives and into an oven to produce a double layered coating. The coated thermographic material was then dried by taping the support to a belt, which was rotated inside a BLUE-M oven. The sample was dried for 5 minutes at 88° C.

When thermally imaged, a black image was formed.
Sample Evaluation

The samples prepared in Example 1 and Comparative Example 1 were evaluated using a "cross-hatch" adhesion test performed according to ASTM D3359-92A. A coated film was cut with a razor blade in a cross-hatched pattern, a piece of commercially available 3M Type 811 Removable Magic® Tape was placed on the pattern and then quickly lifted off. The amount of coating left on the film is the measure of adhesion.

In the thermographic material prepared in Example 1 the thermographic material was removed only from the cross hatched areas.

In the thermographic material prepared in Comparative Example 1 the thermographic material peeled off not only from the cross hatched areas but continued to peel in a long ribbon from the rest of the sample as well.

The invention has been described in detail with particular reference to preferred embodiments thereof, but it will be understood that variations and modifications can be effected within the spirit and scope of the invention.

I claim:

1. A thermographic material comprising a polymeric support and having disposed thereon:
   a) a thermographic imaging layer comprising at least one film-forming polymer, and
   b) a non-imaging layer interposed between and adhering said thermographic imaging layer and said polymeric support and containing no silver,
      said non-imaging layer being coated out of a predominantly organic solvent medium, and comprising a single phase mixture of two or more polymers that include a first polymer serving to promote adhesion of said non-imaging layer to said polymeric support, and a second polymer,
      wherein said film-forming polymer of said thermographic imaging layer and said second polymer of said non-imaging layer are the same or different polyvinyl acetal resins, cellulosic polymers, polyvinyl chloride, polyvinyl acetate, polystyrene, polyacrylonitrile, butadiene-styrene copolymers, acrylate or methacrylate polymers, or maleic anhydride-ester copolymers.

2. The thermographic material of claim 1 wherein said polymeric support is an uncoated and untreated polyester support.

3. The thermographic material of claim 1 wherein both said thermographic imaging and non-imaging layers independently contain at least one polyvinyl acetal.

4. The thermographic material of claim 1 wherein said non-imaging layer has a dry thickness of up to 20 μm.

5. The thermographic material of claim 4 wherein said non-imaging layer has a dry thickness of from about 0.05 μm to about 5 μm.

6. The thermographic material of claim 1 wherein said non-imaging layer comprises a single phase mixture of a polyvinyl acetal resin and a polyester resin.

7. The thermographic material of claim 1 wherein each of said thermographic imaging layer and said non-imaging layer independently contains a cellulosic polymer.

8. The thermographic material of claim 1 wherein said thermographic imaging layer comprises at least 10% (based on dry weight) of said film-forming polymer.

9. The thermographic material of claim 1 wherein said film-forming polymer of said thermographic imaging layer and said second polymer of said non-imaging layer are the same or different polyvinyl acetal resins, cellulosic polymers, or maleic anhydride-ester copolymers.

10. The thermographic material of claim 9 wherein said film-forming polymer of said thermographic imaging layer and said second polymer of said non-imaging layer are the same or different polyvinyl acetal resins.

11. A thermographic material comprising a polymeric support and having disposed on one side of said polymeric support:
    a) a thermographic imaging layer comprising at least one film-forming polymer, and
    b) a non-imaging layer interposed between and adhering said thermographic imaging layer and said polymeric support and containing no silver,
       said non-imaging layer being coated out of a predominantly organic solvent medium and comprising two or more polymers that form a single phase mixture, said two or more polymers including a first polymer serving to promote adhesion of said non-imaging layer to said polymeric support, and a second polymer,
       wherein said film-forming polymer in said thermographic imaging layer and said second polymer in said non-imaging layer are the same or different polyvinyl acetal resins, cellulosic polymers, polyvinyl chloride, polyvinyl acetate, polystyrene, polyacrylonitrile, butadiene-styrene copolymers, acrylate or methacrylate polymers, or maleic anhydride-ester copolymers,
    and disposed on the opposing side of said polymeric support:
    a) a third layer comprising at least one film-forming polymer, and
    b) a fourth layer interposed between and adhering said third layer and said polymeric support and containing no silver, said fourth layer being coated out of a predominantly organic solvent medium and comprising two or more polymers that form a single phase mixture, said two or more polymers including a third polymer serving to promote adhesion of said fourth layer to said polymeric support, and a fourth polymer, wherein said film-forming polymer in said third layer and said fourth polymer in said fourth layer are the same or different polyvinyl acetal resins, cellulosic polymers, polyvinyl chloride, polyvinyl acetate, polystyrene, polyacrylonitrile, butadiene-styrene copolymers, acrylate or methacrylate polymers, or maleic anhydride-ester copolymers.

12. The thermographic material of claim 11 wherein said thermographic imaging and second layers independently comprise a polyvinyl acetal resin or a cellulosic polymer, and said third and fourth layers independently comprise a polyvinyl acetal resin or a cellulosic polymer.

13. The thermographic material of claim 11 wherein said third layer is an antistatic layer or a layer containing a matting agent.

14. The thermographic material of claim 11 wherein said second and fourth layers are directly disposed on said polymeric support.

15. The thermographic material of claim 11 wherein said non-imaging layer includes a single phase mixture of a polyvinyl acetal and a polyester resin.

16. The thermographic material of claim 1 wherein said thermographic imaging layer comprises a non-photosensitive source of reducible silver ions and a reducing composition for said reducible silver ions.

17. A method of promoting adhesion of a thermographic imaging layer to a polymeric support comprising:

A) forming on a polymeric support, a non-imaging layer out of a second fluid predominantly comprising a second organic solvent medium, said non-imaging layer containing no silver, and B) simultaneously or subsequently, forming a thermographic imaging layer containing at least one film-forming polymer out of a first fluid predominantly comprising a first organic solvent on said non-imaging layer, said non-imaging layer comprising a single phase mixture of two or more polymers that include a first polymer serving to promote adhesion of said non-imaging layer to said polymeric support, and a second polymer, wherein said film-forming polymer in said thermographic imaging layer and said second polymer in said non-imaging layer are the same or different polyvinyl acetal resins, cellulosic polymers, polyvinyl chloride, polyvinyl acetate, polystyrene, polyacrylonitrile, butadiene-styrene copolymers, acrylate or methacrylate polymers, or maleic anhydride-ester copolymers.

18. The method of claim 17 wherein said thermographic imaging and non-imaging layers are applied to said polymeric support simultaneously.

19. The method of claim 18 wherein said thermographic imaging and non-imaging layers are formed using slide coating.

20. The method of claim 17 wherein said thermographic aging layer is coated on top of said non-imaging layer while said non-imaging layer is still wet with said second fluid.

21. The method of claim 17 wherein said first and second organic solvents are the same.

22. The method of claim 17 wherein the wet coating thickness of said non-imaging layer is less than 50 $\mu$m.

23. The method of claim 22 wherein the wet coating thickness of said non-imaging layer is from about 0.1 to about 20 $\mu$m.

24. The method of claim 17 further comprising forming on the opposing side of said polymeric support, C) a fourth layer out of a fourth fluid predominantly comprising a fourth organic solvent, said fourth layer containing no silver, and D) a third layer comprising at least one film-forming polymer out of a third fluid predominantly comprising a third organic solvent, said fourth layer comprising two or more polymers that form a single phase mixture, said two or more polymers including a third polymer serving to promote adhesion between said polymeric support and said fourth layer, and a fourth polymer, wherein said film-forming polymer in said third layer and said fourth polymer in said fourth layer are the same or different polyvinyl acetal resins, cellulosic polymers, polyvinyl chloride, polyvinyl acetate, polystyrene, polyacrylonitrile, butadiene-styrene copolymers, acrylate or methacrylate polymers, or maleic anhydride-ester copolymers.

25. The method of claim 24 wherein said third layer is an antistatic layer or a layer containing a matting agent.

26. The method of claim 24 wherein each of said thermographic imaging and non-imaging layers independently comprises a polyvinyl acetal, and each of said third and fourth layers independently comprises a polyvinyl acetal or a cellulosic polymer.

27. The method of claim 26 wherein said non-imaging layer and said fourth layer independently comprise a single phase mixture of a polyvinyl acetal and a polyester.

* * * * *